(12) United States Patent
Perina

(10) Patent No.: US 7,464,512 B1
(45) Date of Patent: Dec. 16, 2008

(54) HOLLOW STRUCTURAL MEMBER

(76) Inventor: Mark J. Perina, 2206 S. 115th St., Omaha, NE (US) 68144

( * ) Notice: Subject to any disclaimer, the term of this patent is extended or adjusted under 35 U.S.C. 154(b) by 631 days.

(21) Appl. No.: 10/797,778

(22) Filed: Mar. 10, 2004

(51) Int. Cl.
*E04H 12/00* (2006.01)

(52) U.S. Cl. ..................... 52/651.01; 52/848

(58) Field of Classification Search .............. 52/153, 52/726.1, 726.3, 726.4, 737.1, 736.1, 732.1, 52/651.01, 651.02, 651.03, 651.07; 256/65.04–65.06, 256/65.08
See application file for complete search history.

(56) References Cited

U.S. PATENT DOCUMENTS

| 835,279 | A | * | 11/1906 | Haskell | 52/651.02 |
|---|---|---|---|---|---|
| 3,196,990 | A | | 7/1965 | Handley | 189/23 |
| 3,217,459 | A | | 11/1965 | Meyer | 52/731 |
| 3,276,182 | A | | 10/1966 | Handley | 52/731 |
| 3,728,837 | A | | 4/1973 | Kiefer, Jr. | 52/731 |
| 4,248,025 | A | | 2/1981 | Kleine et al. | 52/731 |
| 5,117,607 | A | | 6/1992 | Bourdon | 52/731 |
| 5,133,164 | A | * | 7/1992 | Legler | 52/165 |
| 5,263,297 | A | * | 11/1993 | Kim | 52/723.1 |
| 6,278,198 | B1 | | 8/2001 | Willis et al. | 290/55 |
| 6,505,785 | B2 | | 1/2003 | Willis et al. | 240/55 |
| 6,522,025 | B2 | | 2/2003 | Willis et al. | 290/55 |
| 6,957,518 | B1 | * | 10/2005 | Koch, Jr. | 52/726.1 |
| 7,160,085 | B2 | * | 1/2007 | de Roest | 416/244 R |
| 2003/0205021 | A1 | * | 11/2003 | Ryan | 52/736.1 |

* cited by examiner

*Primary Examiner*—Richard E Chilcot, Jr.
*Assistant Examiner*—Jessica Laux
(74) *Attorney, Agent, or Firm*—Thomte Patent Law Office; Dennis L. Thomte

(57) ABSTRACT

A structural member such as a wind turbine tower comprising a plurality of elongated hollow pole sections secured together in an end-to-end relationship with each of the hollow pole sections comprising a plurality of longitudinally extending peripheral sections joined together. Each of the peripheral sections is bent along at least one longitudinally extending break line to define a plurality of angled wall sections extending between longitudinally inwardly extending edge portions. The edge portions of the peripheral sections are bolted together to form a hollow pole section.

2 Claims, 6 Drawing Sheets

HOLLOW STRUCTURAL MEMBER

BACKGROUND OF THE INVENTION

1. Field of the Invention

This invention relates to a hollow structural member such as a wind turbine tower or the like.

2. Description of the Related Art

Wind turbines are becoming more popular in the production of electrical energy. The wind turbine normally comprises a rotor-driven generator mounted atop a tower which may reach heights of 70 meters or more.

In assignee's U.S. Pat. Nos. 6,278,198; 6,505,785; and 6,522,025, a wind turbine is shown to be mounted on the upper end of a tubular tower comprised of tubular pole sections secured to one another in an end-to-end fashion. Each of the pole sections in assignee's prior wind turbine towers is comprised of a single sheet of steel material which is bent and welded together to form a cylindrical or tubular pole section. Because the individual pole sections are fabricated at a factory remote from the job site, the pole sections are either welded to one another at the factory or are welded together at the job site. In either case, the pole sections or the assembled pole must be shipped to the job site and the size of the pole sections and pole make the transportation task somewhat difficult.

SUMMARY OF THE INVENTION

A hollow, elongated structural member such as a wind turbine tower is disclosed with the wind turbine tower being comprised of a plurality of elongated hollow pole sections secured together in an end-to-end relationship. Each of the hollow pole sections comprises a plurality of longitudinally extending peripheral sections joined together. Each of the peripheral sections is bent along a plurality of longitudinally extending break lines to define a plurality of angled wall sections extending between inwardly extending edge portions. The peripheral sections may be shipped from the factory to the job site and assembled at the job site to form the hollow pole sections. The edge portions of the peripheral sections are bolted together to form a hollow pole section. The peripheral sections are bolted together from within the hollow pole section.

It is therefore a principal object of the invention to provide an improved structural member of the type described.

A further object of the invention is to provide an improved wind turbine tower.

Still another object of the invention is to provide a wind turbine tower which is comprised of a plurality of hollow pole sections joined together in an end-to-end relationship with each of the pole sections being comprised of a plurality of peripheral sections bolted together.

Still another object of the invention is to provide a wind turbine tower of the type described wherein the peripheral sections are joined together by bolt members from within the interior of the pole section.

Yet another object of the invention is to provide a wind turbine tower of the type described which eliminates the need for guide rails to be secured to the exterior surface of the tower.

These and other objects will be apparent to those skilled in the art.

DESCRIPTION OF THE PREFERRED EMBODIMENT

The numeral 10 refers to a hollow, elongated structural member such as a wind turbine tower as illustrated in assignee's U.S. Pat. Nos. 6,278,198; 6,505,785 and 6,522,025. In the wind turbine towers of U.S. Pat. Nos. 6,278,198; 6,505,785 and 6,522,025, guide rails are provided on the exterior surface of the tower to enable a wind turbine support or sled to move along the length of the tower. The instant invention eliminates the need for rails, as will be described hereinafter.

Tower 10 is constructed with a plurality of elongated hollow metal pole sections 12 which are secured together in an end-to-end relationship by splice plate assemblies 14, such as described in assignee's pending patent application Ser. No. 10/463,155, filed Jun. 17, 2003, entitled A TWO-PLATE SPLICE CONNECTION ASSEMBLY. The pole sections 12 may be tapered or non-tapered as desired.

Figure 1:
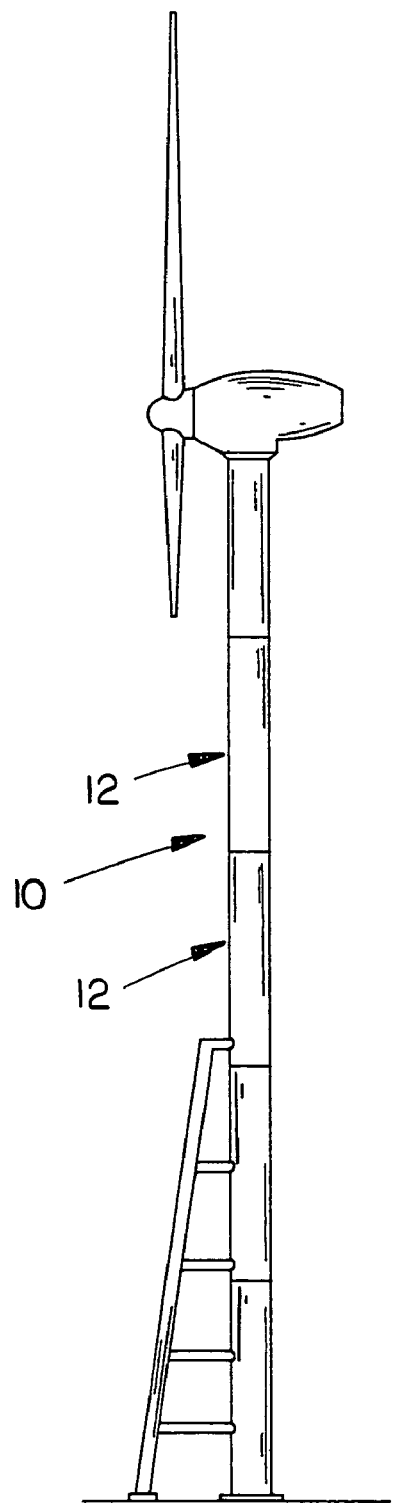
FIG. 1 is a side view of the wind turbine tower of this invention.
Figure 2:
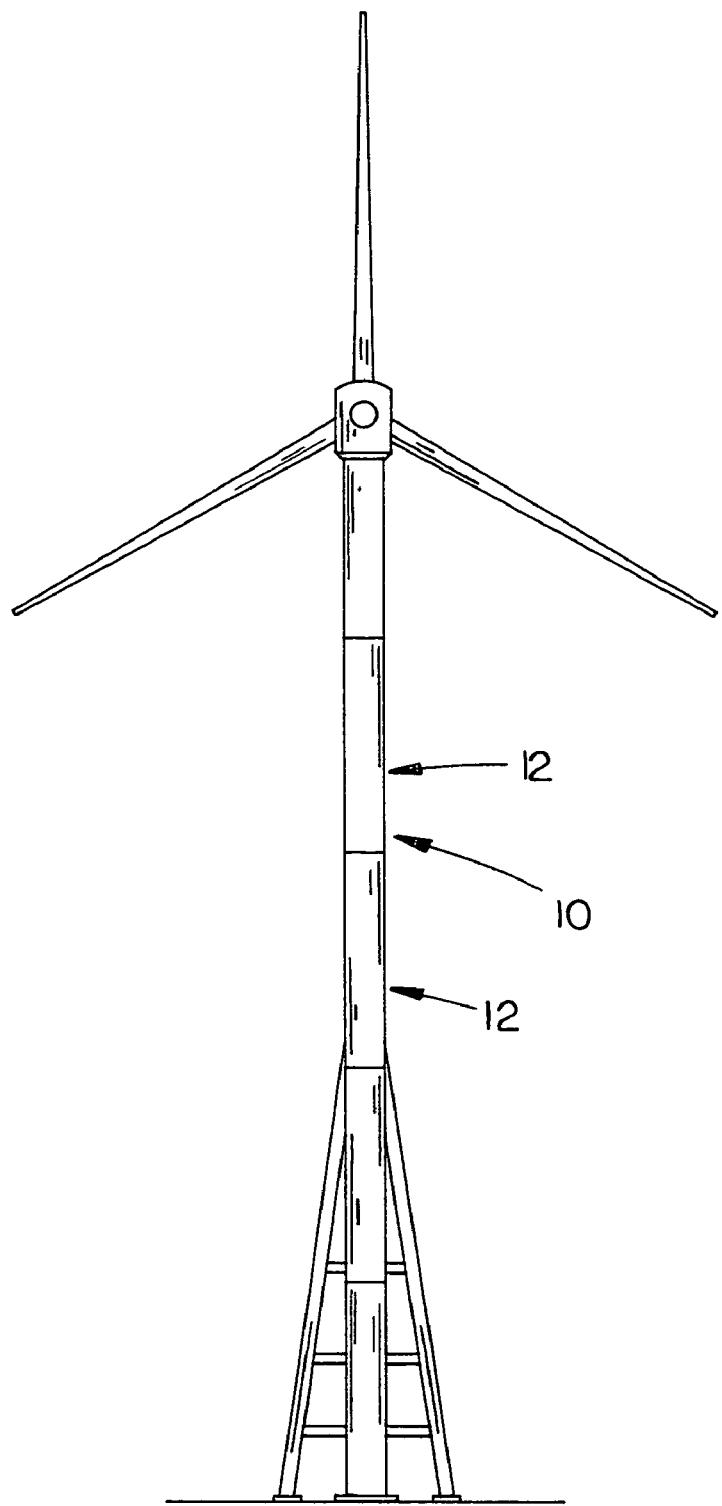
FIG. 2 is a front view of the wind turbine tower of this invention.
Figure 3:
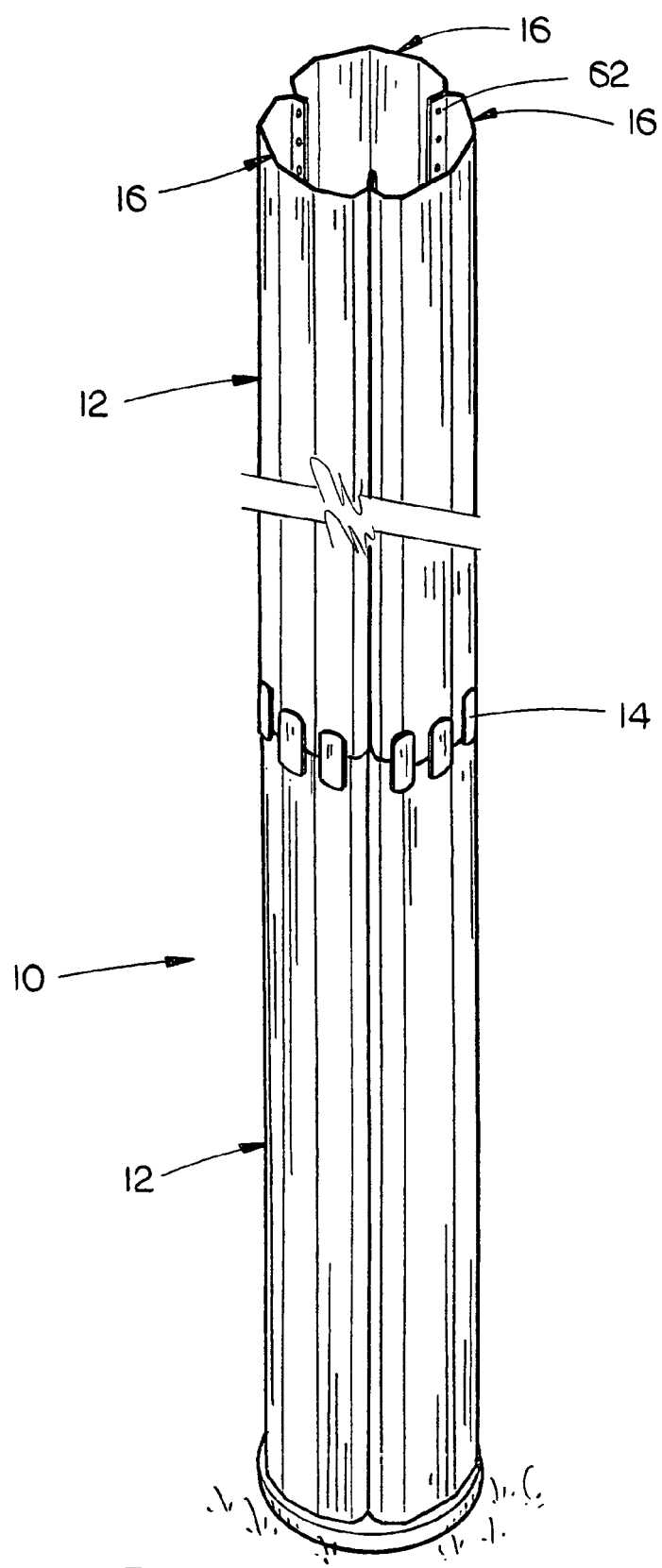
FIG. 3 is a partial perspective view of the hollow structural member of this invention.
Figure 4:
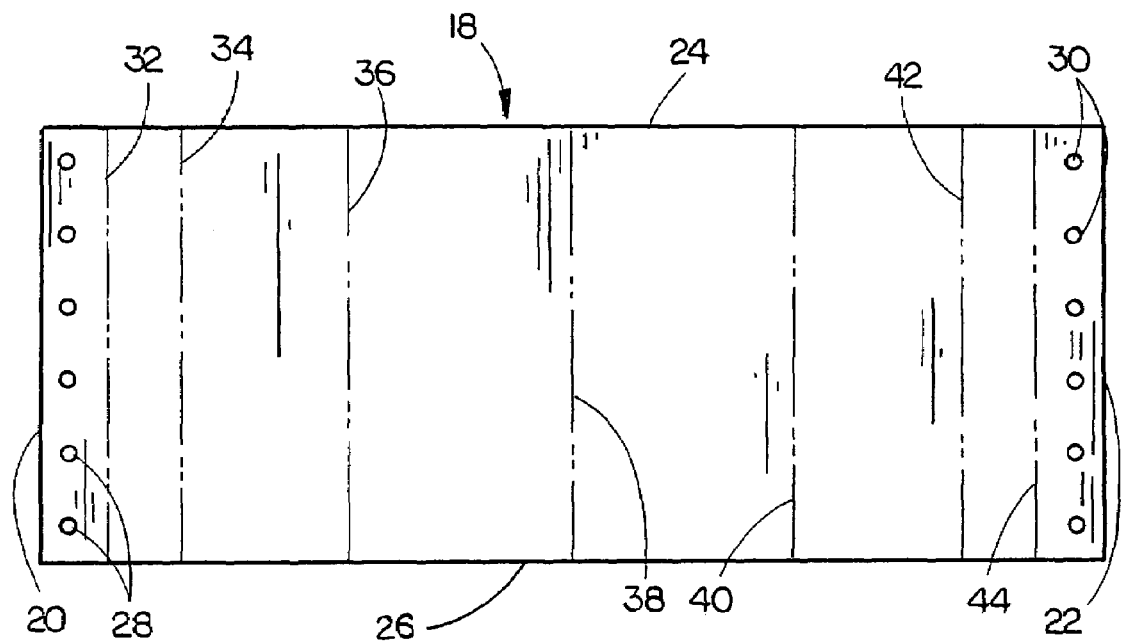
FIG. 4 is a plan elevational view of a flat sheet member which is bent or broken to form a peripheral section of a pole section.
Figure 5:
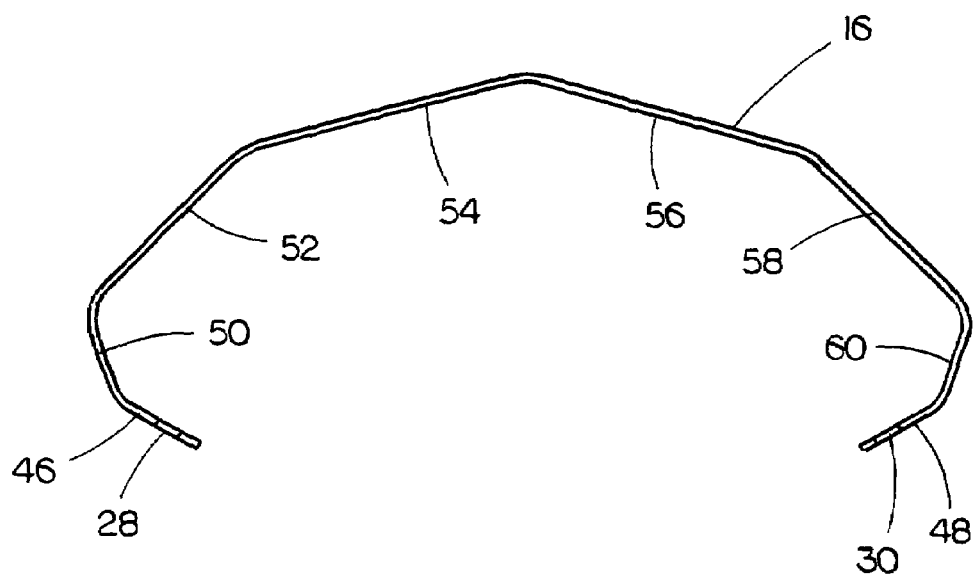
FIG. 5 is an end view of a peripheral section of a pole section.
Figure 6:
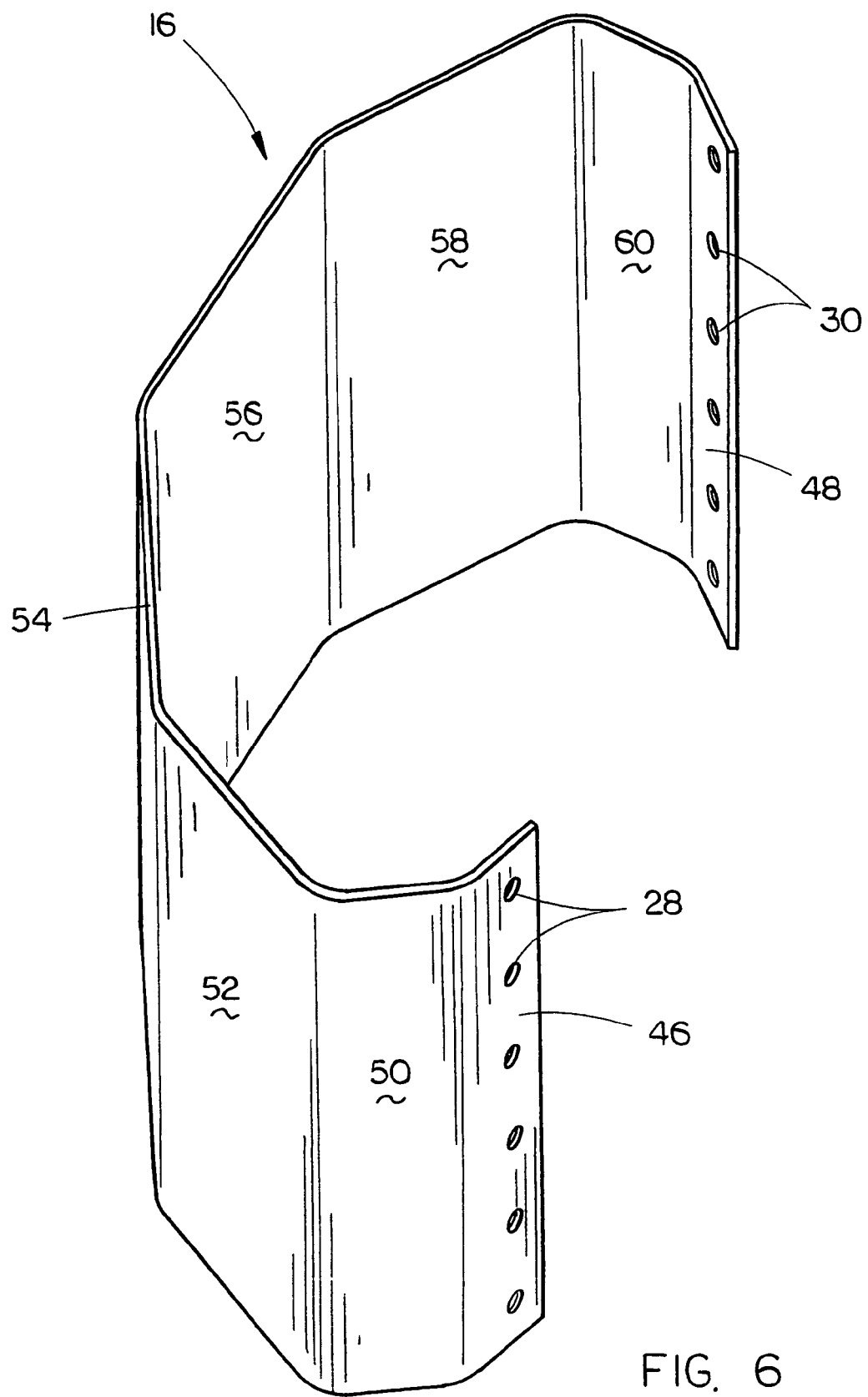
FIG. 6 is a perspective view of a peripheral section.
Figure 7:
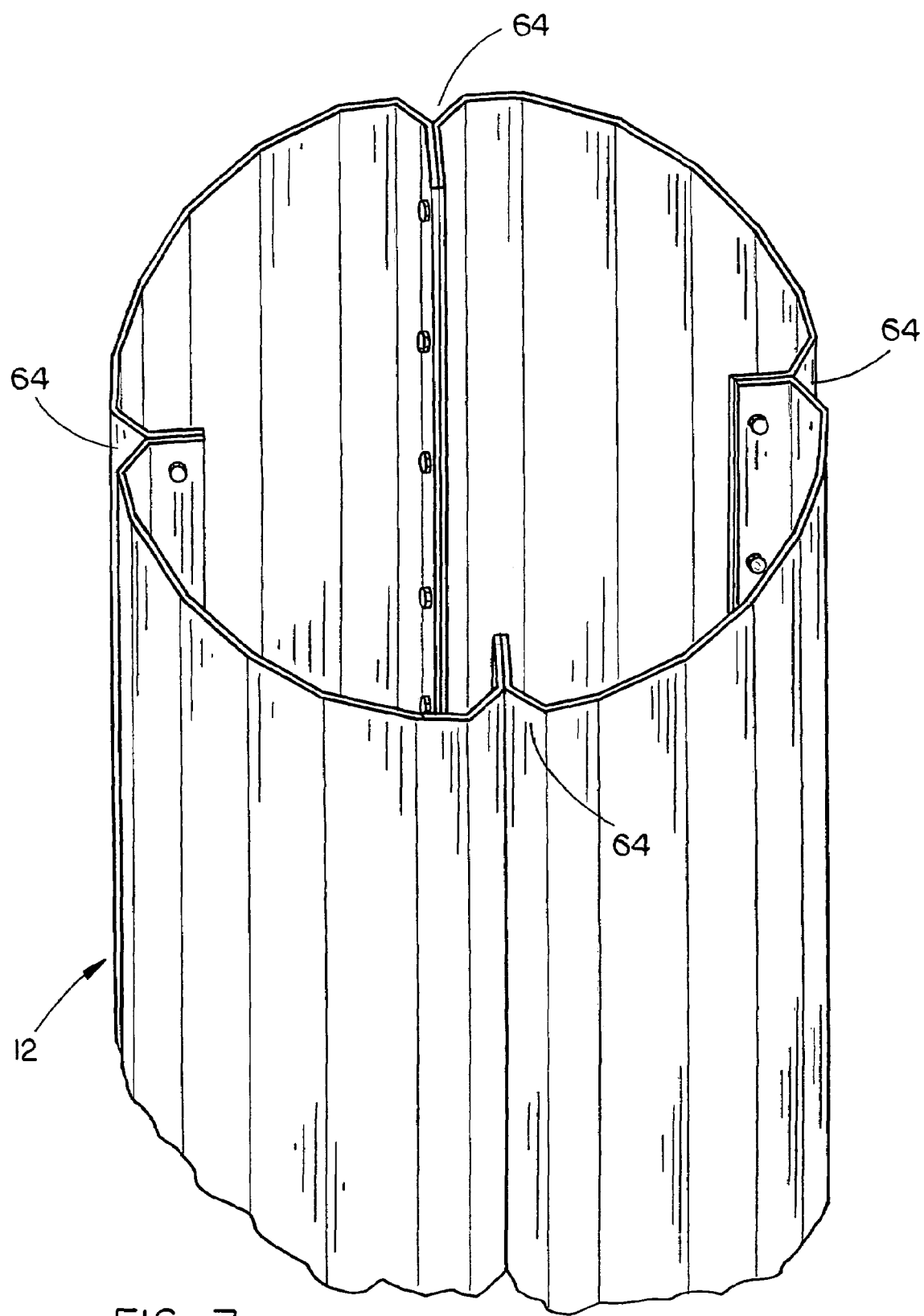
FIG. 7 is a partial perspective view of one of the pole sections.
Figure 8:
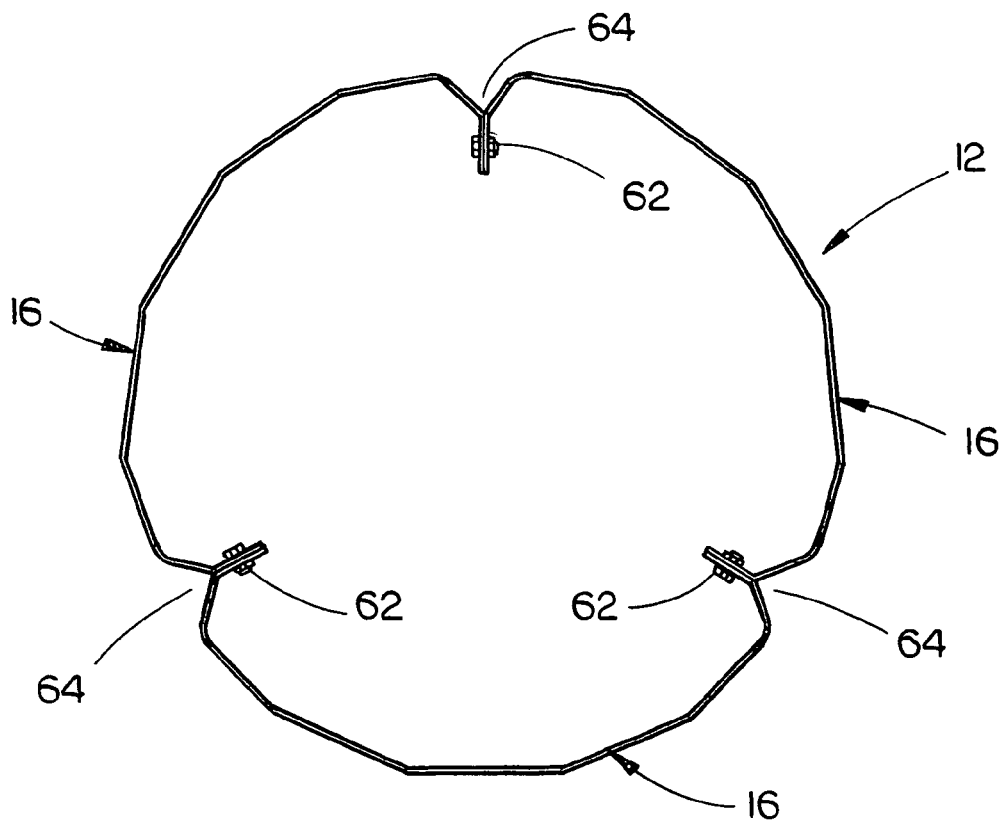
FIG. 8 is an end view of one of the pole sections.

Each of the pole sections 12 is constructed of a plurality of longitudinally extending peripheral sections 16, preferably three (FIG. 3). Each section 16 is formed or bent from a flat sheet 18 having side edges 20 and 22, upper edge 24 and lower edge 26 (FIG. 4). In one embodiment, the sheet 18 preferably has a width of 116.50 inches and a height of 472 inches. If the wind tower is tapered, the width of the upper edge 24 will be less than the width of the lower end 26. A plurality of bolt openings 28 are formed in sheet 18 adjacent side edge 20 and a plurality of bolt openings 30 are formed in sheet 18 adjacent side edge 22. The sheet 18 is bent or broken along break lines 32, 34, 36, 38, 40, 42 and 44 to create the configuration seen in FIG. 5. As seen in FIG. 5, the break lines are radiused.

The break lines form edge portions 46 and 48, and angled wall sections 50, 52, 54, 56, 58 and 60. Edge portions 46 and 48 have the same width. Wall sections 50 and 60 have the same width. Walls sections 52 and 58 have the same width. Wall sections 54 and 56 have the same width. The width of wall sections 50 and 60 is less than the width of wall sections 52 and 58. The width of wall sections 52 and 58 is less than the width of wall sections 54 and 56.

Once formed, the bent peripheral sections 18 may be shipped to the job site for assembly on site. At the job site, each of the pole sections 12 is assembled by joining three peripheral sections 16 together, as seen in FIG. 3. The adjacent edge portions of the sections 16 are secured together from within the pole section by inserting bolts 62 through the registering bolt openings 28 and 30. When assembled, the juncture of the peripheral sections 16 form generally V-shaped recesses 64 therebetween (FIG. 9) which may receive rollers or the like extending from a wind turbine support or sled which eliminates the need for securing guide rails to the exterior of the pole sections. Although the preferred embodiment utilizes three peripheral sections 16 for each pole section, the pole section could be comprised of more than three peripheral sections with those sections being modified as required.

Figure 9:
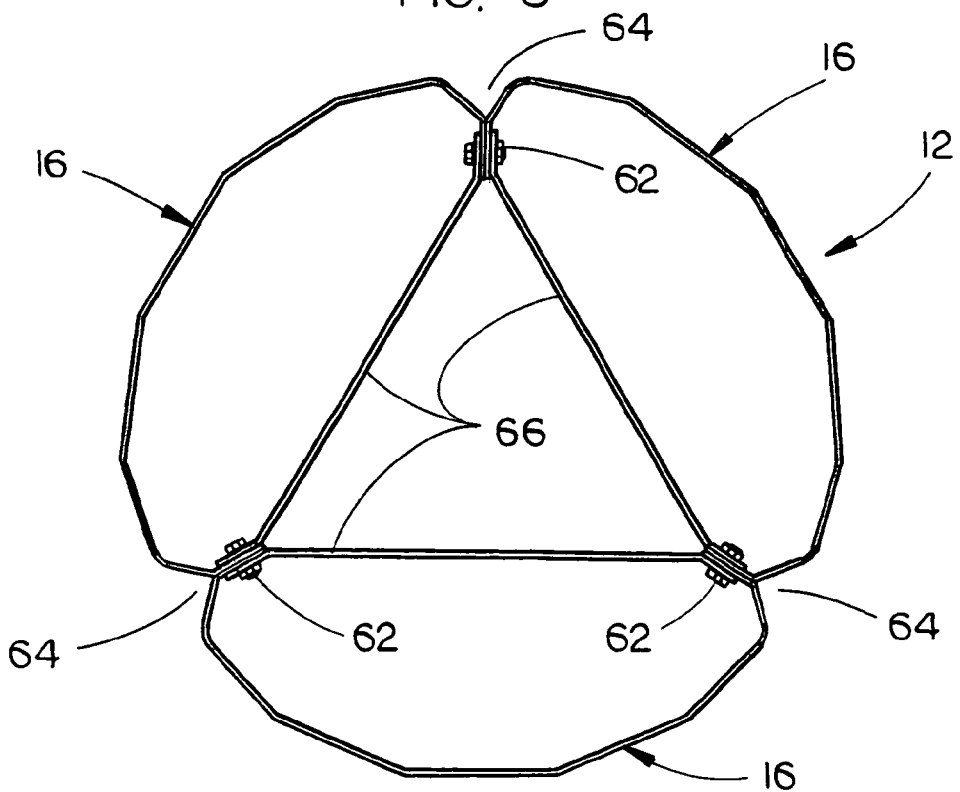
FIG. 9 is a view similar to FIG. 8 except that internal bracing is shown.

If required, a plurality of vertically spaced-apart braces 66 may be secured to the edge portions of the peripheral sections, as seen in FIG. 9. After the pole sections 12 have been assembled, the pole sections 12 are preferably secured together in an end-to-end relationship by means of splice plate assemblies 14, preferably of the design described in assignee's co-pending application Ser. No. 10/463,155 filed Jun. 17, 2003, entitled A TWO-PLATE SPLICE CONNECTION ASSEMBLY.

It should be noted that the structural member could be comprised of three peripheral sections having five angled wall sections, five peripheral sections having four angled wall sections, four peripheral sections having seven angled wall sections, or any number or combination thereof.

It can therefore be seen that a novel hollow structural member such as a wind turbine tower has been provided wherein: (1) the individual peripheral sections 16 may be shipped to the job site and then assembled into pole sections 12 or the peripheral sections 16 may be assembled at the factory and then shipped as pole sections 12 to the job site; (2) the peripheral sections 16 may be secured together from within the pole section; (3) the tower is structurally sound; and (4) the need for welding guide rails to the pole sections has been eliminated due to the provision of the V-shaped recesses 64.

Thus it can be seen that the invention accomplishes at least all of its stated objectives.

I claim:

1. A hollow, elongated, structural member comprising:
a plurality of elongated hollow pole sections secured together in an end-to-end relationship;
each of said hollow pole sections comprising a plurality of longitudinally extending peripheral sections joined together;
each of said peripheral sections having upper and lower end edges and first and second side edges;
each of said peripheral sections having first and second vertically extending break lines formed therein adjacent said first and second side edges respectively to form longitudinally inwardly extending first and second edge portions;
each of said peripheral sections also having a plurality of spaced-apart longitudinally extending break lines formed therein between said first and second break lines to form a plurality of substantially planar angled wall sections between said first and second break lines;
said edge portions of said peripheral sections being bolted together by bolt members to form a hollow pole section;
the planar angled wall sections immediately adjacent said first and second break lines of said adjacent peripheral sections defining an externally presented general V-shape therebetween.

2. A wind turbine tower, comprising;
a plurality of elongated hollow pole sections secured together in an end-to-end relationship;
each of said hollow pole sections comprising a plurality of longitudinally extending peripheral sections joined together;
each of said peripheral sections having upper and lower end edges and first and second side edges;
each of said peripheral sections having first and second vertically extending break lines formed therein adjacent said first and second side edges respectively to form longitudinally inwardly extending first and second edge portions;
each of said peripheral sections also having a plurality of spaced-apart longitudinally extending break lines formed therein between said first and second break lines to form a plurality of substantially planar angled wall sections between said first and second break lines;
said edge portions of said peripheral sections being bolted together by bolt members to form a hollow pole section;
the planar angled wall sections immediately adjacent said first and second break lines of said adjacent peripheral sections defining an externally presented general V-shape therebetween.

* * * * *